(12) United States Patent
Gao et al.

(10) Patent No.: US 11,016,674 B2
(45) Date of Patent: May 25, 2021

(54) METHOD, DEVICE, AND COMPUTER PROGRAM PRODUCT FOR READING DATA

(71) Applicant: EMC IP Holding Company LLC, Hopkinton, MA (US)

(72) Inventors: Hongpo Gao, Beijing (CN); Jian Gao, Beijing (CN); Xinlei Xu, Beijing (CN); Geng Han, Beijing (CN); Jianbin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 85 days.

(21) Appl. No.: 16/506,033

(22) Filed: Jul. 9, 2019

(65) Prior Publication Data

US 2020/0026439 A1 Jan. 23, 2020

(30) Foreign Application Priority Data

Jul. 20, 2018 (CN) .......................... 201810801912.7

(51) Int. Cl.
*G06F 3/06* (2006.01)

(52) U.S. Cl.
CPC .......... *G06F 3/0614* (2013.01); *G06F 3/0604* (2013.01); *G06F 3/0647* (2013.01); *G06F 3/0653* (2013.01); *G06F 3/0689* (2013.01)

(58) Field of Classification Search
CPC .... G06F 3/0614; G06F 3/0604; G06F 3/0647; G06F 3/0653; G06F 3/0689
See application file for complete search history.

(56) References Cited

U.S. PATENT DOCUMENTS

| | | | | |
|---|---|---|---|---|
| 7,472,221 B1* | 12/2008 | Cartmell | ............. | G06F 11/2069 711/104 |
| 7,487,292 B2* | 2/2009 | Konta | ................... | G06F 3/0611 711/114 |
| 8,688,643 B1* | 4/2014 | Deopujari | ........... | G06F 11/2056 707/655 |
| 8,862,820 B2* | 10/2014 | Colgrove | ............. | G06F 3/0646 711/114 |
| 10,168,948 B2 | 1/2019 | Wilkinson | | |
| 10,664,189 B2 | 5/2020 | Zhou | | |
| 10,740,181 B2 | 8/2020 | Bolkhovitin et al. | | |
| 10,824,526 B2 | 11/2020 | Kulkarni et al. | | |
| 10,831,603 B2 | 11/2020 | Kulkarni et al. | | |
| 10,901,848 B2 | 1/2021 | Roberts | | |
| 2003/0140210 A1* | 7/2003 | Testardi | ............. | G06F 12/0292 711/203 |

(Continued)

*Primary Examiner* — Ryan Bertram
(74) *Attorney, Agent, or Firm* — BainwoodHuang

(57) ABSTRACT

Techniques are directed to reading data. Such techniques involve in response to receiving a read request for the target data, determining that target data is stored in both a first storage device and a second storage device. Such techniques further involve determining at least one of reliability and access load for each of the first storage device and the second storage device. Such techniques further involve: determining, based on the at least one of the reliability and the access load, one of the first storage device and the second storage device as a target storage device so as to respond to the read request. By means of certain techniques, at least one of the access load and service lives is balanced between storage devices so as to improve the efficiency of data read and the overall performance of a storage system.

20 Claims, 8 Drawing Sheets

(56) References Cited

U.S. PATENT DOCUMENTS

| | | | |
|---|---|---|---|
| 2005/0080991 A1* | 4/2005 | Keohane | G06F 11/2056 |
| | | | 711/114 |
| 2005/0081005 A1* | 4/2005 | Keohane | G06F 3/0611 |
| | | | 711/162 |
| 2006/0190682 A1* | 8/2006 | Noguchi | G06F 9/52 |
| | | | 711/114 |
| 2007/0016754 A1* | 1/2007 | Testardi | G06F 3/0635 |
| | | | 711/206 |
| 2007/0028064 A1 | 2/2007 | McBrearty et al. | |
| 2007/0057956 A1 | 3/2007 | Gimpl et al. | |
| 2011/0276758 A1* | 11/2011 | Garmiza | G06F 3/0659 |
| | | | 711/114 |
| 2013/0326284 A1* | 12/2013 | Losh | G06F 12/0246 |
| | | | 714/47.2 |
| 2014/0304469 A1* | 10/2014 | Wu | G06F 3/0689 |
| | | | 711/114 |
| 2015/0092298 A1* | 4/2015 | Kim | G06F 3/0616 |
| | | | 360/92.1 |
| 2016/0011818 A1* | 1/2016 | Hashimoto | G11C 29/52 |
| | | | 711/103 |
| 2018/0081551 A1* | 3/2018 | Lee | G06F 3/0619 |
| 2018/0081552 A1* | 3/2018 | Lee | G06F 3/065 |
| 2018/0196831 A1* | 7/2018 | Maybee | G06F 3/065 |
| 2018/0210782 A1* | 7/2018 | Gao | G06F 3/0619 |
| 2019/0088293 A1* | 3/2019 | Kim | G11C 16/26 |
| 2019/0332504 A1 | 10/2019 | Bolkhovitin et al. | |

* cited by examiner

METHOD, DEVICE, AND COMPUTER PROGRAM PRODUCT FOR READING DATA

CROSS-REFERENCE TO RELATED APPLICATION

This application claims priority to Chinese Patent Application No. CN201810801912.7, on file at the China National Intellectual Property Administration (CNIPA), having a filing date of Jul. 20, 2018, and having "METHOD, DEVICE AND COMPUTER PROGRAM PRODUCT FOR DATA READ" as a title, the contents and teachings of which are herein incorporated by reference in their entirety.

FIELD

Embodiments of the present disclosure relate to the field of data storage, and more specifically, to a method, device and computer program product for reading data.

BACKGROUND

With the development of data storage technologies, various data storage devices now provide users with increasingly high data storage capacity, and their data access speed has been improved greatly. With the improvement of data storage capacity, users also impose higher demands on response time and other performance of storage systems. So far a variety of data storage systems based on Redundant Array of Independent Disks have been developed to improve performance of storage systems.

For example, mapped Redundant Array of Independent Disks (mapped RAID) has currently been developed. Unlike a conventional RAID algorithm, a mapped RAID algorithm operates hard disk extents instead of the whole hard disk. In mapped RAID, the disk is a logical concept and may comprise multiple extents. Multiple extents comprised by one logical disk may be distributed over different physical storage devices. A storage system may comprise multiple logical disks, i.e., comprise multiple mapped RAIDs, which may share storage devices in a resource pool. For a storage device that is configured as mapped RAID or whose extents are configured as mapped RAID, problems will arise if data are read from such a storage device in a conventional round robin way.

SUMMARY

Embodiments of the present disclosure provide a solution for reading data.

In a first aspect of the present disclosure, there is provided a method of reading data. The method includes in response to receiving a read request for target data, determining that the target data is stored in both a first storage device and a second storage device. The method further includes determining at least one of reliability and access load for each of the first storage device and the second storage device. The method further includes: determining, based on the at least one of the reliability and the access load, one of the first storage device and the second storage device as a target storage device so as to respond to the read request.

In a second aspect of the present disclosure, there is provided an electronic device. The electronic device includes a processor and a memory coupled to the processor, the memory having instructions stored thereon, the instructions, when executed by the processor, causing the device to perform acts. The acts include in response to receiving a read request for target data, determining that the target data are stored in both a first storage device and a second storage device. The acts further include determining at least one of reliability and access load for each of the first storage device and the second storage device. The acts further include: determining, based on the at least one of the reliability and the access load, one of the first storage device and the second storage device as a target storage device so as to respond to the read request.

In a third aspect of the present disclosure, there is provided a computer program product. The computer program product is tangibly stored on a computer readable medium and includes machine executable instructions which, when executed, cause a machine to perform the method according to the first aspect of the present disclosure.

The Summary provided is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent through the following more detailed description of the example embodiments of the present disclosure with reference to the accompanying drawings, wherein the same reference sign generally refers to the like element in the example embodiments of the present disclosure.

DETAILED DESCRIPTION OF EMBODIMENTS

Figure 1:
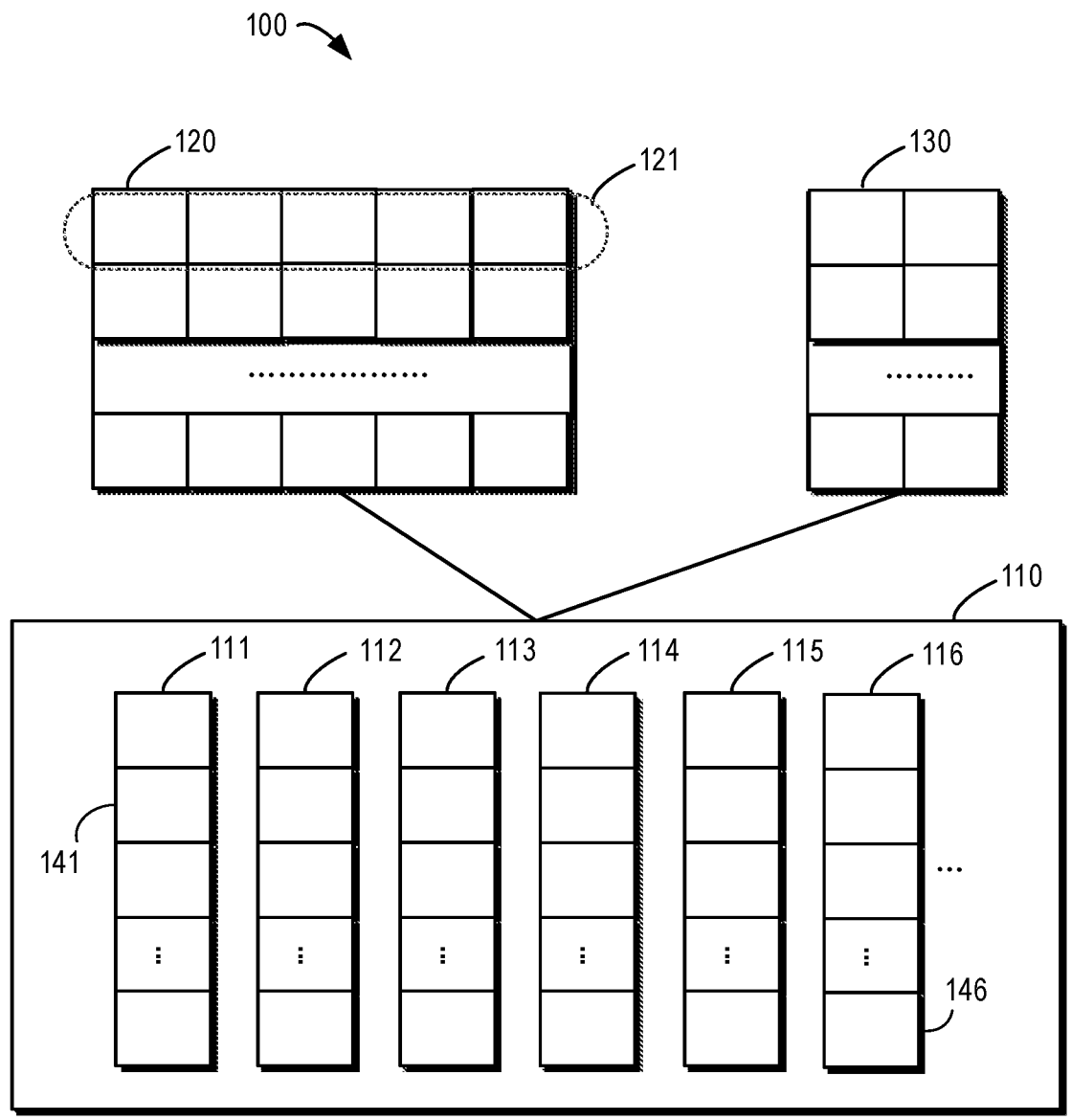
FIG. 1 shows a schematic diagram of a storage system in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one further embodiment." The terms "first", "second" and so on can refer to same or different objects. Other definitions, either explicit or implicit, may be included below.

In the context of the present disclosure, the storage system may be a storage system based on RAID. The storage system based on RAID may combine multiple storage devices into an array of disks. By providing redundant storage devices, reliability for an entire disk group is caused to significantly exceed reliability for a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

FIG. 1 shows a schematic diagram of a storage system 100 in which embodiments of the present disclosure can be implemented. In the storage system 100, there are six storage devices 111-116 in a resource pool 110. Each storage device is divided with the same size of extent (e.g. extents 141 and 146 located in the storage devices 111 and 116 respectively). The resource pool 110 is logically constituted by such extents. The resource pool 110 maintains a disk mapping table and extent states, and responds to extent allocation/release requests and disk state change events. If a storage device crashes, the resource pool 110 would receive an event about this storage device and update states of extents of the storage device.

It is to be noted that although FIG. 1 shows six storage devices 111-116, the resource pool 110 may include more or less storage devices. It is also to be noted that the storage device described herein may be any persistent data storage device, such as a hard disk drive (HDD), a solid-state disk (SSD), etc.

At least one mapped RAID, such as RAIDs 120 and 130, may be built using extents in the resource pool 110. In the storage system 100 as illustrated, the mapped RAID 120 is shown as RAID 5 (4D+1P, wherein 4D represents four extents for storing data and 1P represents one extent for storing P parity). The mapped RAID 120 includes multiple stripes, and extents in each stripe (e.g., a stripe 121) are distributed across a plurality of storage devices. For example, extents in the stripe 121 may be located in some of the plurality of storage devices 111-116 respectively, e.g. in the storage devices 111-115.

Mapped RAID 130, which is shown as RAID 1 type in FIG. 1, may also be formed based on the resource pool 110. It is to be noted that although FIG. 1 shows the mapped RAIDs 120 and 130, other appropriate mapped RAID may also be formed based on the resource pool 110. It is also to be noted that the storage system 100 may include a further resource pool based on other storage devices, as well as other mapped RAID formed based on the further resource pool.

In the storage system 110, there might occur such a circumstance in which same data is stored in different storage devices (i.e., the storage devices 111 and 116). As an example, the extents 141 and 146 may store the same data. For example, the extents 141 and 146 may be consumed by the mapped RAID 130 as mirror extents, that is, data stored in the extent 146 is duplication of data stored in the extent 141. Alternatively, the extents 141 and 146 may be consumed by the mapped RAID 120, and data in the extent 141 is being copied to the extent 146.

In the architecture such as the storage system 110, data copy operation (hereinafter referred to as copy operation in short) is more frequent than a storage system with traditional RAID. More operations in connection with the resource pool 110 might trigger data copy between extents.

For example, when an existing storage device in the resource pool is swapped with a new storage device, data need to be copied from the existing storage device to the new storage device. When one storage device in the resource pool is set with end-of-life (EOL), the proactive copy will be initiated to move data from the EOL storage device to other healthy storage device. When the resource pool is expanded with a new storage device, data copy to the new storage device will also be triggered. In addition, creation of the mapped RAID and the input/output (I/O) load and storage device wear level balance may also trigger the data copy.

An algorithm for reading data from different storage devices or different extents (i.e. such storage devices or extents mirror each other), which store the same data, is called mirror RAID algorithm herein. During the above data copy operation, extents in two storage devices are combined into a mirror, and data are read using the mirror RAID algorithm. This means that in such a new architecture, more read requests will use the mirror RAID read algorithm.

Traditionally, only storage devices of the mirror RAID type and the proactive copy need to use the mirror RAID algorithm. Except the mirror RAID and the proactive copy, there are few opportunities to use the mirror RAID algorithm to read data. In the traditional mirror RAID algorithm, for a write request from a user, data need to be written to both extents that are in a copy state. For the read request from a user, usually one extent is selected from the two extents in a round-robin way to read data.

However, inventors have realized that several problems exist in such implementations. In a storage system with new architecture as shown in FIG. 1, each storage device is divided into multiple disk extents. One storage device may service I/O requests from several mapped RAIDS, which differs from the traditional RAID that one storage device is only consumed by one RAID group. Therefore, in the architecture with the mapped RAID, the access load may differ a lot between storage devices where two disk extents reside.

Since the conventional mirror RAID algorithm does not consider the healthy state (or reliability) and access load for a storage device, data might be read from a storage device with very low reliability or from a storage device having a heavy access load. Both the circumstances might reduce the speed and efficiency of data read and further affect the performance of the storage system. In addition, as mentioned above, in the new architecture as shown in FIG. 1, copy operations become more frequent, which means that access by a user will be affected more significantly than in the conventional architecture.

The present disclosure provides an improved solution for reading data. In embodiments of the present disclosure, when data to be read is stored in different storage devices, one storage device is selected as a target storage device to read data, based on at least one of the reliability and access load for the storage devices. In this way, at least one of the access load and service lives can be balanced between storage devices, so that the access efficiency and overall performance of the storage system can be improved.

Figure 2:
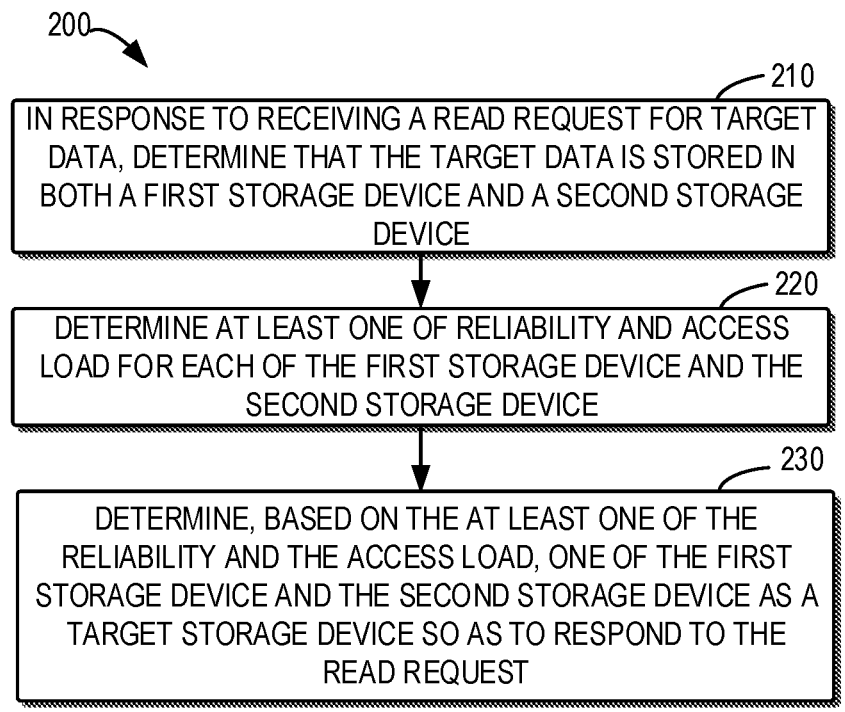
FIG. 2 shows a flowchart of a data read process according to embodiments of the present disclosure.

Embodiments of the present disclosure will be described in detail with reference to the accompanying drawings. FIG. 2 shows a flowchart of a data read process 200 according to embodiments of the present disclosure. For the sake of discussion, the storage system 100 shown in FIG. 1 is taken as an example for illustrating embodiments of the present disclosure. However, it should be understood that embodiments of the present disclosure may also be implemented in other types of storage system.

At block 210, in response to receiving a read request for the target data (also referred to as data to be read), it is determined that the target data is stored in both a first storage device and a second storage device. For example, the storage system 100 may determine that the target data is stored in the storage devices 111 and 116. Specifically, the storage system 100 may determine that the target data is stored in the extents 141 and 146. In this case, the extents 141 and 146 may be mirror extents used by the mapped RAID 130; or may be extents used by the mapped RAID 120, and a copy operation is performed between the extents 141 and 146, e.g., data in the extent 141 is being copied to the extent 146.

At block 220, at least one of the reliability and access load for each of the first storage device and the second storage device is determined. In some embodiments, the storage system 100 may determine the reliability or access load for the storage device 111 and storage device 116. In some embodiments, the storage system 100 may determine both the reliability and the access load. The reliability for the storage device herein refers to the capability that the storage device properly provides data read or write, and the access load for the storage device is used to describe the amount of operations associated with read and write that are being executed currently or have been executed historically in the storage device. The reliability and access load for the storage device may be represented by various predefined indications. Approaches that can be used to determine the reliability and access load is described below in detail.

At block 230, one of the first storage device and the second storage device is determined, based on the at least one of the reliability and the access load, as a target storage device to respond to the read request. For example, the storage device 111 may be determined as the target storage device to read the target data.

In some embodiments, a first access load for the first storage device may be compared with a second access load for the second storage device. If the first access load is lower than the second access load, then the first storage device may be determined as the target storage device. For example, a comparison may be made between the access load for the storage devices 111 and 116. If the storage device 111 has a lower access load than the storage device 116, then the storage device 111 may be determined as the target storage device.

In some embodiments, first reliability for the first storage device may be compared with second reliability for second storage device. If the first reliability is higher than the second reliability, then the first storage device may be determined as the target storage device. For example, a comparison may be made between the reliability for the storage devices 111 and 116. If the storage device 111 has a higher reliability than the storage device 116, then the storage device 111 may be determined as the target storage device.

In some embodiments, in addition to depending on the reliabilities for the storage devices, the target storage device may further be determined based on whether the reliabilities for the storage devices are higher or lower than one or more threshold reliability. In some embodiments, the target storage device may be determined in combination of the reliability and access load. Such embodiments will be described in detail with reference to FIGS. 4 to 6.

The process 200 for determining the target storage device according to embodiments of the present disclosure has been described with reference to FIG. 2. In such embodiments, the access load between different storage devices may be better balanced by taking the access load into consideration; the deterioration of the storage device with lower reliability may be slowed down by taking the reliability into consideration, so as to balance service lives of different storage devices. In this way, efficiency of data read and overall performance of the storage system may be improved.

Figure 3:
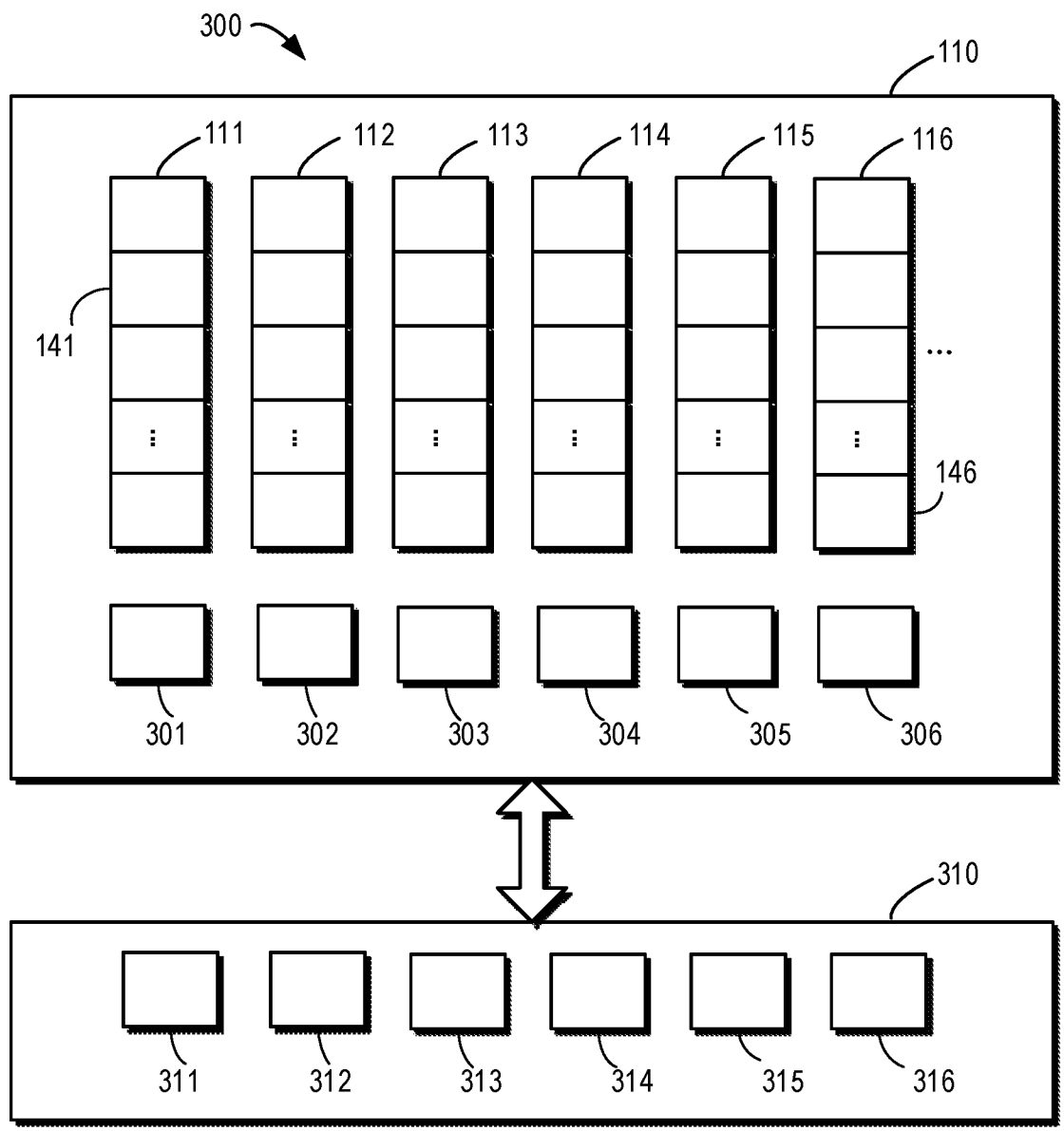
FIG. 3 shows a schematic diagram of determining reliability according to some embodiments of the present disclosure.

As mentioned above, the reliability and access load for the storage device may be determined in various ways. In some embodiments, the reliability may be determined using an error handling mechanism in the storage system 100. FIG. 3 shows a schematic diagram 300 for determining the reliability according to embodiments of the present disclosure.

As shown in FIG. 3, in a physical layer 310, a corresponding physical disk object (PDO), such as PDOs 311-316, is created on each physical disk (not shown). The PDOs 311-316 receive an I/O request and convert the I/O request to an SCSI request, and vice versa. The PDOs 311-316 implement a disk error handling mechanism (DIEH) to maintain health of the disks. DIEH defines several error types, such as hard media error, soft media error (repairable error), and port error.

If the number of soft media error increases and exceeds a threshold, then DIEH may send to the resource pool 110 an event indicating that the disk is approaching EOL. The event can trigger the resource pool 110 to start the proactive copy. If the error is serious enough, then the resource pool 110 may directly shut the disk. The resource pool 110 can trigger the rebuild and replace the fault disk with another healthy disk after the rebuild is completed. In the DIEH mechanism, an error count for soft media is maintained for each disk. Once the error count exceeds a predefined threshold, related actions may be taken depending on the error severity, such as to reset the disk, set the disk as EOL or set the disk as "Fault". Therefore, in such a storage system, the reliability for a storage device may be determined by obtaining the DIEH data of a corresponding physical disk.

As shown in FIG. 3, in the resource pool 110, virtual drivers (PVDs) 301-306 are maintained for the storage devices 111-116 respectively. The PVDs 301-306 are used to maintain storage device information which may be used by the resource pool 110. The PVDs 301-306 in the resource pool 110 correspond to the PDOs 311-316 in the physical layer 310, respectively. Therefore, reliability data for physical disks as obtained from the PDOs 311-316 may be used as reliability indications for the corresponding storage devices 111-116.

As an example, the ratio of an error I/O count to a total I/O count may be used as the reliability indication. Alternatively or additionally, reliability levels may be defined, such as high reliability, medium reliability or low reliability. For example, a storage device without any I/O error has a high reliability level, and a storage device set as EOL has a low reliability level. Reliability levels may also be divided based on the ratio of the error I/O count to the total I/O count.

When the storage system is started, the PVDs 301-306 will be connected to the PDOs 311-316, and the resource pool 110 will collect and initialize the reliability indication for each of the storage devices 111-116. When the reliability indications maintained in the PDOs 311-316 are changed, a message about the change will be sent to the PVDs 301-306, and the reliability indication for each of the storage devices 111-116 as maintained in the PVDs 301 to 306 will be updated accordingly.

In such embodiments, the storage system 100 may utilize the reliability indication in the PVD corresponding to each storage device to determine the reliability for the respective storage device. For example, the reliability for the storage devices 111 and 116 may be determined using the reliability indication in the PVDs 301 and 306, respectively.

It is to be noted that the approaches for determining the reliability as described with reference to FIG. 3 are merely by way of example. In other embodiments, the reliability for the storage device may be determined by other appropriate approaches. For example, the reliability may be determined by an intelligent diagnosis function of the storage device.

In some embodiments, the current number of access to a storage device may be used as the access load. In the resource pool as shown in FIG. 1, one storage device is divided into multiple disk extents. The same storage device (all extents therefrom) will be used by many stripes (e.g. stripes 121) in the same mapped RAID or by multiple mapped RAIDs (e.g. the mapped RAIDs 120 and 130). Thus, the access load on the different storage devices 111-116 may differ a lot based on the above mapped RAID access pattern.

To this end, the storage system 100 has to maintain the access load for each of the storage devices 111-116. In some embodiments, the current access load or historical access load for a corresponding storage device may be recorded in each of the PVDs 301-306 as shown in FIG. 3. For example, a parameter IO_per_driver may be set to record the current access load for the storage device.

Specifically, when an access request (read request or write request) is sent from a stripe in the mapped RAID to the resource pool 110, the parameter IO_per_driver of a storage device associated with the request will be incremented. When the access ends, the parameter IO_per_driver will be decreased atomically. In this way, the parameter IO_per_driver may be used as the current access load for the corresponding storage device. In such an embodiment, the parameter IO_per_driver may be determined as the access load for the corresponding storage device. For example, a value of the parameter IO_per_driver stored in the PVD 301 may be used as a value of the access load for the storage device 111.

In some embodiments, the total number of access to the storage device in a given period of time may be determined as the access load. For example, the total number of access to the storage device since the storage system is started may be used as the access load.

In such embodiments, the resource pool 110 may provide an interface for mapped RAID to obtain data related to the reliability and access load. For example, data related to the reliability and access load for the storage device may be obtained by identification of the resource pool, an index of the storage device, etc.

It is to be noted that the approaches described above for determining the reliability and access load are merely by way of example. In embodiments of the present disclosure, parameters associated with the reliability and access load for the storage device may be predefined and determined by any other appropriate means. The scope of the present disclosure is not limited in this regard.

Figure 4:
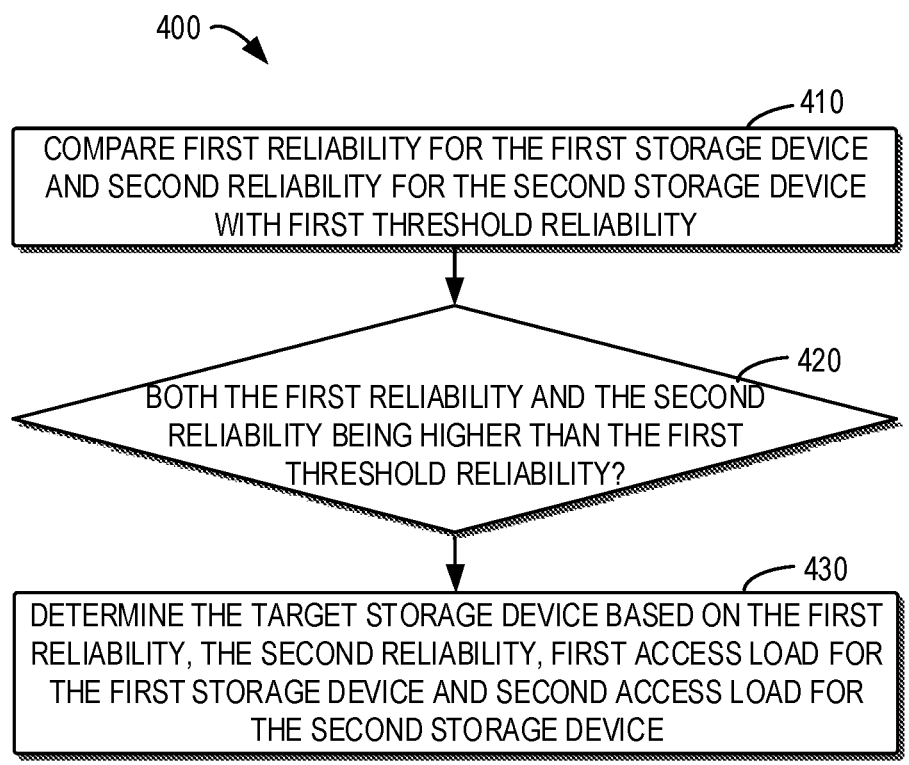
FIG. 4 shows a flowchart of a process of determining a target storage device according to some embodiments of the present disclosure.

As mentioned above, the target storage device may be further determined based on the reliabilities for the storage devices relative to the threshold reliability. FIG. 4 shows a flowchart of a process 400 for determining a target storage device according to some embodiments of the present disclosure. The process 400 may be regarded as a specific implementation of block 230 shown in FIG. 2.

At block 410, first reliability for the first storage device and second reliability for the second storage device are compared with first threshold reliability, respectively. The first threshold reliability may indicate a lower reliability for a storage device. A storage device having reliability lower than the first threshold reliability might be in an unhealthy state or at a low reliability level, which means that the storage device is no longer suitable for data read. For example, the storage device having reliability lower than the first threshold reliability may be a storage device set as EOL.

At block 420, it is determined whether both the first reliability and the second reliability are higher than the first threshold reliability. If both the first reliability and the second reliability are higher than the first threshold reliability, then at block 430 the target storage device is determined based on the first reliability, the second reliability, first access load for the first storage device and second access load for the second storage device.

In some cases, it is determined at block 420 that not both the first reliability and the second reliability are higher than the first threshold reliability, e.g. it is determined the first reliability is higher than the first threshold reliability and the second reliability is lower than the first threshold reliability. In this case, the first storage device may be determined as the target storage device. For example, if the reliability for the storage device 111 is higher than the first threshold reliability while the reliability for the storage device 116 is lower than the first threshold reliability, then the storage device 111 may be determined as the target storage device for reading the target data.

In some cases, it might be determined at block 420 that both the first reliability and the second reliability are lower than the first threshold reliability. In this case, data may be read from the first storage device and the second storage device in the traditional round-robin way. The round-robin way refers to a way in which one storage device is successively selected from a sequence of related storage devices. The round-robin way will be described in detail with reference to FIG. 5.

In such embodiments, by comparing the reliability for a storage device with the threshold reliability, a storage device with poor performance may be determined so as to avoid reading data from such a storage device.

Figure 5:
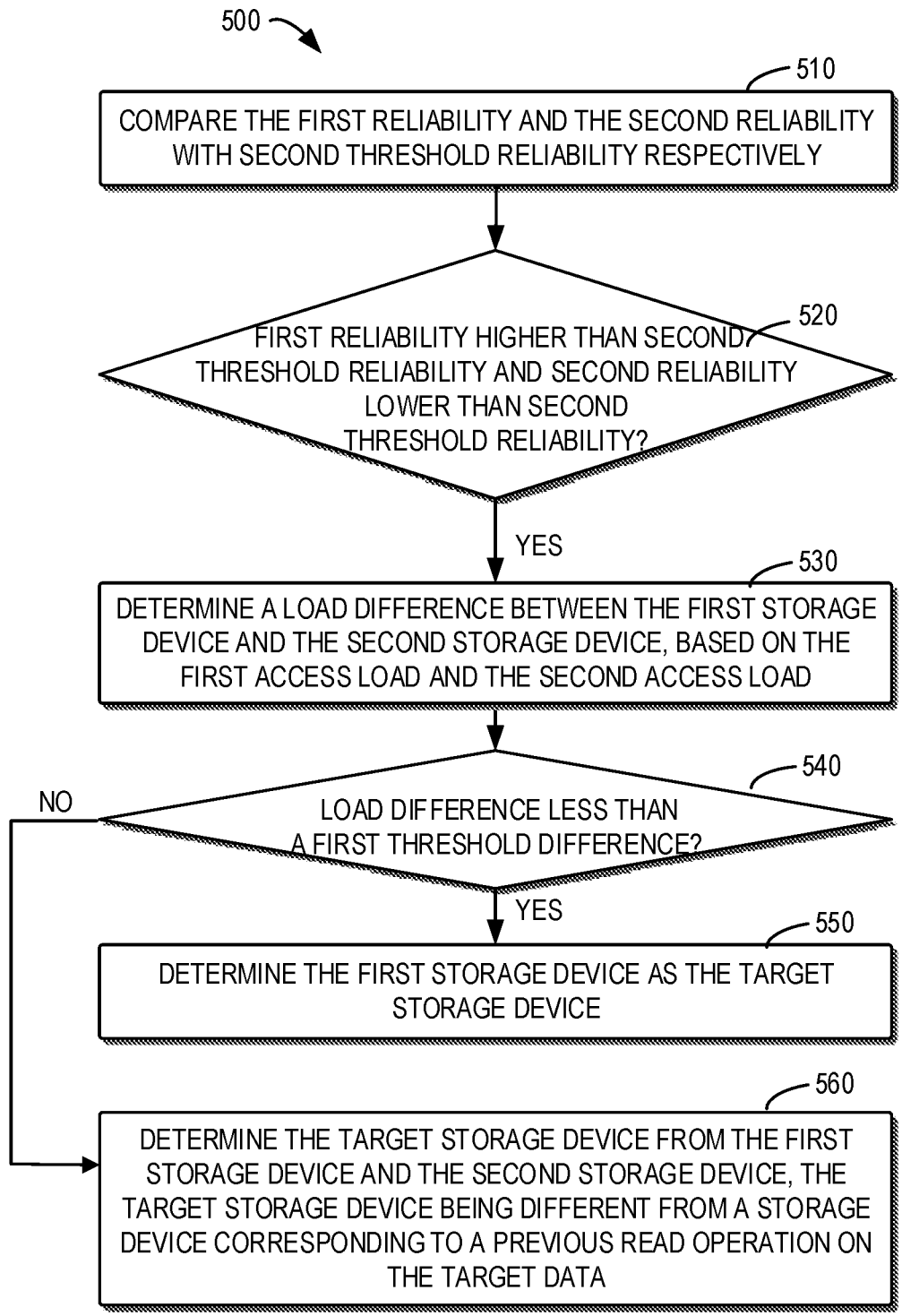
FIG. 5 shows a flowchart of a process of determining a target storage device according to some embodiments of the present disclosure.

As mentioned with reference to FIG. 4, in some embodiments, the target storage device may be determined in combination of the reliability and access load. FIG. 5 shows a flowchart of a process 500 of determining a storage device according to some embodiments of the present disclosure. The process 500 describes how to determine a target storage device based on the first reliability, second reliability, first access load and second access load. The process 500 may be considered as a specific implementation of block 430 as shown in FIG. 4.

At block 510, the first reliability and the second reliability are compared with second threshold reliability respectively. The second threshold reliability is higher than the first threshold reliability. The reliability that is higher than the first threshold reliability and lower than the second threshold reliability may indicate that the corresponding storage device is at a medium reliability level.

At block 520, it is determined whether the first reliability is higher than the second threshold reliability and the second reliability is lower than the second threshold reliability. For example, it may be determined that the reliability for the storage device 111 is higher than the second threshold reliability and the reliability for the storage device 116 is lower than the second threshold reliability. In this case, the reliability for both the storage devices 111 and 116 is not low enough (e.g., not in an EOL state), whereas the storage devices 111 and 116 are at different reliability levels. Thus, the target storage device may be determined in combination with the access load for the two storage devices.

If the first reliability is higher than the second threshold reliability and the second reliability is lower than the second threshold reliability, then at block 530 a load difference between the first storage device and the second storage device is determined based on the first access load and the second access load. The load difference may be a percentage of difference between the first access load and the second access load. For example, it may be determined at block 530 that the load difference between the storage device 111 and the storage device 116 is A % (wherein A is greater than and equal to 0 and less than and equal to 100). It is to be noted that representing the load difference as A % is merely by way of example and does not limit the scope of the present disclosure in any manner.

At block 540, it is determined whether the load difference is less than a first threshold difference. The first threshold difference may be, for example, 30%. If the load difference is less than the first threshold difference, then at block 550 the first storage device is determined as the target storage device, i.e., the storage device with higher reliability is determined as the target storage device. For example, if the load difference between the storage device 111 and the storage device 116 is 10%, then the storage device 111 (with reliability higher than the storage device 116) may be determined as the target storage device. It is to be noted that the above percentage is merely by way of example and does not limit the scope of the present disclosure in any manner.

If the load difference is not less than the first threshold difference, then at block 560 the target storage device is determined using the traditional round-robin way. That is, at block 560 the target storage device is determined from the first storage device and the second storage device, and the determined target storage device is different from a storage device corresponding to a previous read operation on the target data. For example, when reading data in the extents 141 and 146 previously, if data was read from the extent 141 last time, then at block 560 the storage device 116 would be determined as the target storage device; if data was read from the extent 146 last time, then at block 560 the storage device 111 would be determined as the target storage device. It is to be noted that for the case in which the load difference is equal to the first threshold difference, the storage device with higher reliability may be determined as the target storage device.

In such embodiments, the reliability for storage devices is at different levels. By combining the reliability with the access load, a storage device with poor reliability may be prevented from bearing too much load, which otherwise would accelerate the performance deterioration of the storage device. In this way, the performance of the storage system may be further improved.

Figure 6:
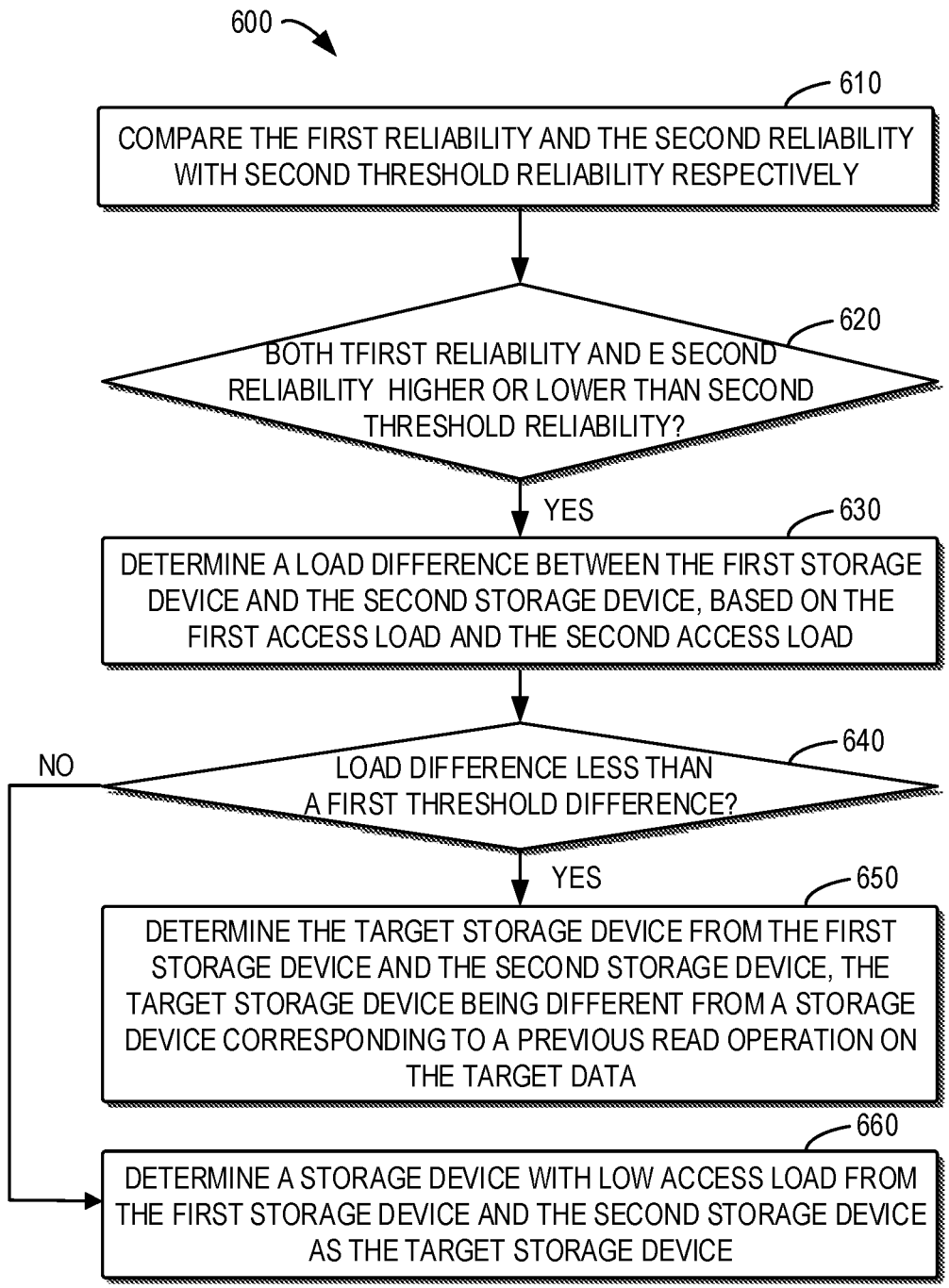
FIG. 6 shows a flowchart of a process of determining a target storage device according to some embodiments of the present disclosure.

FIG. 6 shows a flowchart of a process 600 of determining a storage device according to some embodiments of the present disclosure. The process 600 describes how to determine a target storage device based on the first reliability, second reliability, first access load and second access load. The process 600 may be considered as another specific implementation of block 430 shown in FIG. 4.

At block 610, the first reliability and the second reliability are compared with second threshold reliability respectively. The second threshold reliability is higher than the first threshold reliability. Block 610 is similar to block 510 as described with reference to FIG. 5. At block 620, it is determined whether both the first reliability and the second reliability are higher than the second threshold reliability. For example, at block 620 it may be determined that the reliability for both the storage devices 111 and 116 is higher than the second threshold reliability or the reliability for both the storage devices 111 and 116 is lower than the second threshold reliability. In this case, the reliability for the storage devices 111 and 116 is at the same reliability level, so the target storage device may be determined in combination with the access load for the two storage devices.

If both the first reliability and the second reliability are higher or lower than the second threshold reliability, then at block 630 a load difference between the first storage device and the second storage device is determined based on the first access load and the second access load. Block 630 is similar to block 530 as described with reference to FIG. 5. For example, it may be determined at block 630 that the load difference between the storage device 111 and the storage device 116 is B % (wherein B is greater than and equal to 0 and less than and equal to 100). It is to be noted that representing the load difference as B % is merely by way of example and does not limit the scope of the present disclosure in any manner.

At block 640, it is determined whether the load difference is less than a second threshold difference. The second threshold difference may be, for example, 20%. If the load difference is less than the second threshold difference, then at block 650 the target storage device is determined from the first storage device and the second storage device, and the target storage device is different from a storage device corresponding to a previous read operation on the target data. That is, the target storage device is determined using the traditional round-robin way. In this case, the determined target storage device is different from a storage device corresponding to a previous read operation on the target data. Block 650 is similar to block 560 as described with reference to FIG. 5. It is to be noted that the above percentage is merely by way of example and does not limit the scope of the present disclosure in any manner.

If at block 640 it is determined the load difference is not less than the second threshold difference, then at block 660 a storage device with lower access load is determined from the first storage device and the second storage device as the target storage device. For example, if the access load for the storage device 111 is less than that of the storage device 116, then the storage device 111 may be determined as the target storage device. It is to be noted that for the case in which the load difference is equal to the second threshold difference, the target storage device may also be determined using the above described round-robin way.

In such embodiments, the reliability for storage devices is at similar levels. By combining the reliability with the access load, the load between storage devices may be balanced, which is beneficial to the overall improvement of the data read efficiency. In this way, the performance of the storage system may be further improved.

In the above embodiments described with reference to FIGS. 5 and 6, by comparing with the second threshold reliability, it may be determined whether the reliability for the first storage device and the second storage device is at the same or similar reliability levels. Then, different policies may be applied to the load difference based on such determining. Such combination of the reliability with the access load better helps to increase the overall performance of the storage system.

It is to be noted that the above mentioned first threshold reliability, second threshold reliability, first threshold difference and second threshold difference may be each determined based on specific configuration of the storage system. The scope of the present disclosure is not limited in this regard.

Figure 7:
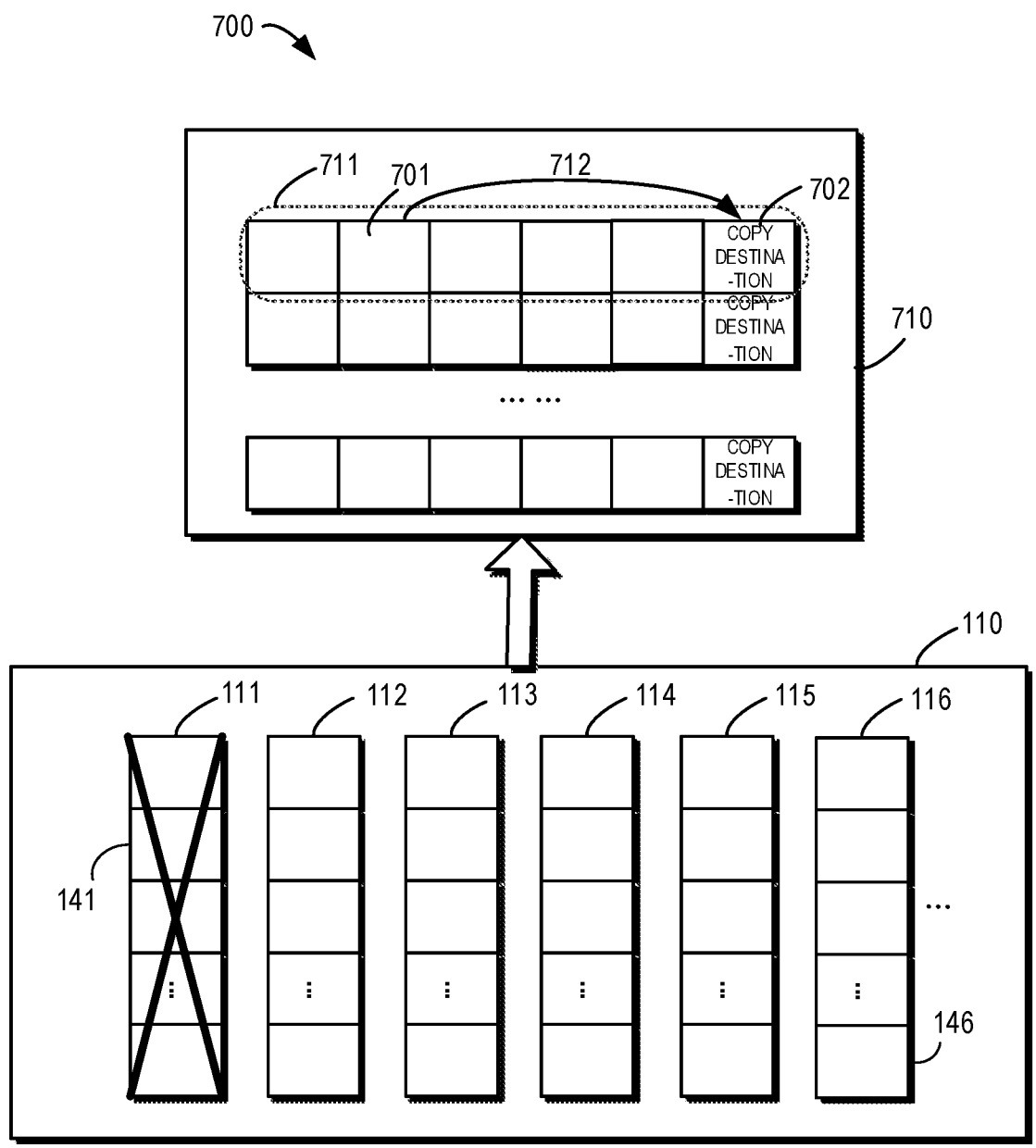
FIG. 7 shows a schematic diagram of performing a copy operation on an extent according to some embodiments of the present disclosure.

As mentioned in connection with FIG. 1, data copy operation is quite frequent in the storage system 100. The extents 141 and 146 may be formed as mirror extents due to data copy operation. FIG. 7 depicts a schematic diagram 700 of performing copy operation on the extent 141 according to some embodiments of the present disclosure. In the example of FIG. 7, the storage device 111 is set as EOL, so data in this storage device need to be copied to other healthy storage device. Specifically, data in each extent of the storage device 111 may be copied to an extent of other storage device. As shown in FIG. 7, for example, data in the extent 141 are being copied to the extent 146.

In order to manage the copy operation, an element 702 may be added to the end of each stripe of a RAID mapping table (e.g., a mapping table 710) so as to represent a copy destination. In FIG. 7, an element 701 in the mapping table 710 represents the extent 141, and the element 702 represents the extent 146. The storage system may perform a copy operation 712 so as to copy data in the extent 141 to the extent 146. For such a copy operation, the extent 141 is referred to as a source storage region and the extent 146 is referred to as a destination storage region herein. It should be understood that in this case the source storage region and the destination storage region are located in different storage devices.

In such embodiments, when the target data to which the received read request is directed is stored in the extent 141, it first needs to be determined whether the target data has been copied from the source storage region to the destination storage region, i.e., whether the target data has been copied from the extent 141 to the extent 146. In some embodiments, metadata for describing the progress of the copy operation may be set, which are also referred to as a checkpoint herein. The checkpoint may be used to identify an end position of data in the source storage region that has been copied to the destination storage region. For example, the checkpoint may be an address of the smallest data unit (e.g. data block) in a storage device that is last copied to the destination storage region.

Target data at a position (e.g., determined by a logical block address LBA) after the checkpoint in the source storage region has not been copied to the destination storage region. Therefore, for such target data, a storage device, where the source storage region resides, is selected as the target storage device.

Target data at a position preceding the checkpoint in the source storage region are already copied to the destination storage region. For example, in the example of FIG. 7, if the target data is at a position preceding the checkpoint in the extent 141, then it may be determined the target data is stored in both the extent 141 and the extent 146. That is, the target data is stored in both the storage device 111 and the storage device 116. In this case, the methods described with reference to FIGS. 2, 4, 5 and 6 may be used to determine from which storage device the target data will be read.

It should be understood that the copy operation described with reference to FIG. 7 is merely by way of example. Embodiments of the present disclosure may be applied to a storage device that is in a mirror mode due to various copy operations. Applying embodiments of the present disclosure to the storage system with frequent copy operations may reduce the impact of copy operations on the read performance of the storage system.

Figure 8:
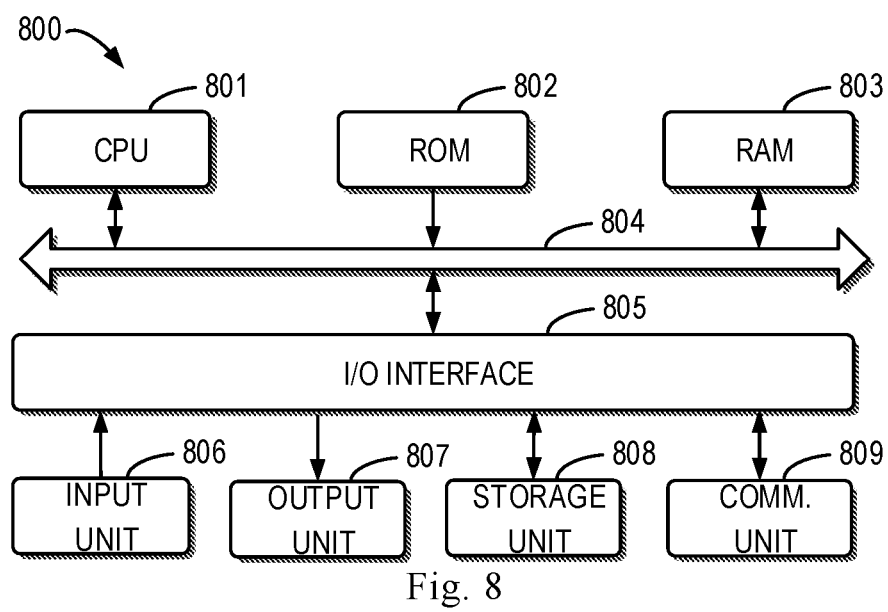
FIG. 8 shows a block diagram of an example device that can be used to implement embodiments of the present disclosure.

FIG. 8 is a schematic block diagram illustrating an example device 800 that can be used to implement embodiments of the present disclosure. As illustrated, the device 800 includes a central processing unit (CPU) 801 which can perform various suitable acts and processing based on the computer program instructions stored in a read-only memory (ROM) 802 or computer program instructions loaded into a random access memory (RAM) 803 from a storage unit 808. The RAM 803 also stores various types of programs and data required by operating the storage device 800. CPU 801, ROM 802 and RAM 803 are connected to each other via a bus 804 to which an input/output (I/O) interface 805 is also connected.

Various components in the apparatus 800 are connected to the I/O interface 805, including: an input unit 806, such as a keyboard, mouse and the like; an output unit 807, such as a variety of types of displays, loudspeakers and the like; a storage unit 808, such as a magnetic disk, optical disk and the like; and a communication unit 809, such as a network card, modem, wireless communication transceiver and the like. The communication unit 809 enables the device 800 to exchange information/data with other devices via a computer network such as Internet and/or a variety of telecommunication networks.

The processing unit 801 performs various methods and processes as described above, for example, any of the processes 200, 400, 500 and 600. For example, in some embodiments, any of the processes 200, 400, 500 and 600 may be implemented as a computer software program or computer program product, which is tangibly included in a machine-readable medium, such as the storage unit 808. In some embodiments, the computer program can be partially or fully loaded and/or installed to the device 800 via ROM 802 and/or the communication unit 809. When the computer program is loaded to RAM 803 and executed by CPU 801, one or more steps of any of the processes 200, 400, 500 and 600 described above are implemented. Alternatively, in other embodiments, CPU 801 may be configured to implement any of the processes 200, 400, 500 and 600 in any other suitable manner (for example, by means of firmware).

According to some embodiments of the present disclosure, there is provided a computer readable medium. The computer readable medium is stored with a computer program which, when executed by a processor, implements the method according to the present disclosure.

Those skilled in the art would understand that various steps of the method of the disclosure above may be implemented via a general-purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A method of reading data, comprising:
in response to receiving a read request for target data, determining that the target data is stored in both a first storage device and a second storage device;
determining at least one of reliability and access load for each of the first storage device and the second storage device; and
determining, based on the at least one of the reliability and the access load, one of the first storage device and the second storage device as a target storage device so as to respond to the read request;
wherein determining one of the first storage device and the second storage device as the target storage device comprises:
comparing first reliability for the first storage device and second reliability for the second storage device with first threshold reliability; and
in response to both the first reliability and the second reliability being higher than the first threshold reliability, determining the target storage device based on the first reliability, the second reliability, first access load for the first storage device and second access load for the second storage device; and
wherein determining the target storage device based on the first reliability, the second reliability, the first access load and the second access load comprises:
comparing the first reliability and the second reliability with second threshold reliability respectively, the second threshold reliability being higher than the first threshold reliability; and
based on a result of comparing the first reliability and the second reliability with second threshold reliability, selecting one of the first storage device and the second storage device as the target storage device.

2. The method of claim 1, further comprising:
in response to receiving a second read request for second target data and determining that the second target data is stored in both of the first storage device and the second storage device, determining one of the first storage device and the second storage device as the target storage device for the second read request by:
comparing first access load for the first storage device with second access load for the second storage device; and
in response to the first access load being lower than the second access load, determining the first storage device as the target storage device for the second read request.

3. The method of claim 1, further comprising:
in response to receiving a second read request for second target data and determining that the second target data is stored in both of the first storage device and the second storage device, determining one of the first storage device and the second storage device as the target storage device for the second read request by:
comparing the first reliability for the first storage device with the second reliability for the second storage device; and
in response to the first reliability being higher than the second reliability, determining the first storage device as the target storage device for the second read request.

4. The method of claim 1, further comprising:
in response to receiving a second read request for second target data and determining that the second target data is stored in both of the first storage device and the second storage device, determining one of the first storage device and the second storage device as the target storage device for the second read request by:
comparing the first reliability for the first storage device and the second reliability for the second storage device with the first threshold reliability respectively; and
in response to the first reliability being higher than the first threshold reliability and the second reliability being lower than the first threshold reliability, determining the first storage device as the target storage device for the second read request.

5. The method of claim 1, wherein selecting one of the first storage device and the second storage device as the target storage device comprises:
in response to the first reliability being higher than the second threshold reliability and the second reliability being lower than the second threshold reliability,
determining a load difference between the first storage device and the second storage device, based on the first access load and the second access load;
in response to the load difference being less than a first threshold difference, determining the first storage device as the target storage device; and
in response to the load difference being greater than the first threshold difference, determining the target storage device from the first storage device and the second storage device, the target storage device being different from a storage device corresponding to a previous read operation on the target data.

6. The method of claim 1, wherein selecting one of the first storage device and the second storage device as the target storage device comprises:
in response to both the first reliability and the second reliability being higher or lower than the second threshold reliability,
determining a load difference between the first storage device and the second storage device, based on the first access load and the second access load;
in response to the load difference being greater than a second threshold difference, determining a storage device with low access load from the first storage device and the second storage device as the target storage device; and
in response to the load difference being less than the first threshold difference, determining the target storage device from the first storage device and the second storage device, the target storage device being different from a storage device corresponding to a previous read operation on the target data.

7. The method of claim 1, further comprising:
receiving the read request for the target data while copying data from a source storage region of the first storage device to a destination storage region of the second storage device;
wherein determining that the target data is stored in both the first storage device and the second storage device comprises:
determining that the target data has been copied from the source storage region to the destination storage region.

8. The method of claim 7, wherein determining that the target data has been copied from the source storage region to the destination storage region comprises:
determining an end position of data in the source storage region that has been copied to the destination storage region; and
in response to an end position of the target data in the source storage region preceding the end position of the data that has been copied to the destination storage region, determining that the target data has been copied to the destination storage region.

9. An electronic device, comprising:
a processor; and
a memory coupled with the processor, the memory having instructions stored therein which, when executed by the processor, cause the device to perform acts comprising:
in response to receiving a read request for target data, determining that the target data is stored in both a first storage device and a second storage device;
determining at least one of reliability and access load for each of the first storage device and the second storage device; and
determining, based on the at least one of the reliability and the access load, one of the first storage device and the second storage device as a target storage device so as to respond to the read request;
wherein determining one of the first storage device and the second storage device as the target storage device comprises:
comparing first reliability for the first storage device and second reliability for the second storage device with first threshold reliability, respectively; and
in response to both the first reliability and the second reliability being higher than the first threshold reliability, determining the target storage device based on the first reliability, the second reliability, first access load for the first storage device and second access load for the second storage device; and
wherein determining the target storage device based on the first reliability, the second reliability, the first access load and the second access load comprises:
comparing the first reliability and the second reliability with second threshold reliability respectively, the second threshold reliability being higher than the first threshold reliability; and
based on a result of comparing the first reliability and the second reliability with second threshold reliability, selecting one of the first storage device and the second storage device as the target storage device.

10. The device of claim 9, further comprising:
in response to receiving a second read request for second target data and determining that the second target data is stored in both of the first storage device and the second storage device, determining one of the first storage device and the second storage device as the target storage device for the second read request by:
comparing first access load for the first storage device with second access load for the second storage device; and
in response to the first access load being lower than the second access load, determining the first storage device as the target storage device for the second read request.

11. The device of claim 9, further comprising:
in response to receiving a second read request for second target data and determining that the second target data is stored in both of the first storage device and the second storage device, determining one of the first storage device and the second storage device as the target storage device for the second read request by:
comparing the first reliability for the first storage device with the second reliability for the second storage device; and
in response to the first reliability being higher than the second reliability, determining the first storage device as the target storage device for the second read request.

12. The device of claim 9, further comprising:
in response to receiving a second read request for second target data and determining that the second target data is stored in both of the first storage device and the second storage device, determining one of the first storage device and the second storage device as the target storage device for the second read request by:
comparing the first reliability for the first storage device and the second reliability for the second storage device with the first threshold reliability, respectively; and
in response to the first reliability being higher than the first threshold reliability and the second reliability being lower than the first threshold reliability, determining the first storage device as the target storage device for the second read request.

13. The device of claim 9, wherein selecting one of the first storage device and the second storage device as the target storage device comprises:
in response to the first reliability being higher than the second threshold reliability and the second reliability being lower than the second threshold reliability,
determining a load difference between the first storage device and the second storage device, based on the first access load and the second access load;

in response to the load difference being less than a first threshold difference, determining the first storage device as the target storage device; and in response to the load difference being greater than the first threshold difference, determining the target storage device from the first storage device and the second storage device, the target storage device being different from a storage device corresponding to a previous read operation on the target data.

14. The device of claim 9, wherein selecting one of the first storage device and the second storage device as the target storage device comprises:

in response to both the first reliability and the second reliability being higher or lower than the second threshold reliability, determining a load difference between the first storage device and the second storage device, based on the first access load and the second access load;

in response to the load difference being larger than a second threshold difference, determining a storage device with low access load from the first storage device and the second storage device as the target storage device; and in response to the load difference being less than the first threshold difference, determining the target storage device from the first storage device and the second storage device, the target storage device being different from a storage device corresponding to a previous read operation on the target data.

15. The device of claim 9, wherein the acts further comprise:

receiving the read request for the target data while copying data from a source storage region of the first storage device to a destination storage region of the second storage device;

wherein determining that the target data is stored in both the first storage device and the second storage device comprises:

determining that the target data has been copied from the source storage region to the destination storage region.

16. The device of claim 15, wherein determining that the target data has been copied from the source storage region to the destination storage region comprises:

determining an end position of copied data in the source storage region that has been copied to the destination storage region; and in response to an end position of the target data in the source storage region preceding the end position of the data that has been copied to the destination storage region, determining that the target data has been copied to the destination storage region.

17. A computer program product having a non-transitory computer readable medium which stores a set of instructions to read data; the set of instructions, when carried out by computerized circuitry, causing the computerized circuitry to perform a method of:

in response to receiving a read request for target data, determining that the target data is stored in both a first storage device and a second storage device;

determining at least one of reliability and access load for each of the first storage device and the second storage device; and determining, based on the at least one of the reliability and the access load, one of the first storage device and the second storage device as a target storage device so as to respond to the read request;

wherein determining one of the first storage device and the second storage device as the target storage device comprises:

comparing first reliability for the first storage device and second reliability for the second storage device with first threshold reliability; and in response to both the first reliability and the second reliability being higher than the first threshold reliability, determining the target storage device based on the first reliability, the second reliability, first access load for the first storage device and second access load for the second storage device; and wherein determining the target storage device based on the first reliability, the second reliability, the first access load and the second access load comprises:

comparing the first reliability and the second reliability with second threshold reliability respectively, the second threshold reliability being higher than the first threshold reliability; and based on a result of comparing the first reliability and the second reliability with second threshold reliability, selecting one of the first storage device and the second storage device as the target storage device.

18. The method of claim 1, further comprising:

deriving the first reliability based on a first error input/output (I/O) count for the first storage device; and deriving the second reliability based on a second error I/O count for the second storage device.

19. The device of claim 9, wherein the acts further comprise:

deriving the first reliability based on a first error input/output (I/O) count for the first storage device; and deriving the second reliability based on a second error I/O count for the second storage device.

20. The computer program product of claim 17, wherein the method further comprises:

deriving the first reliability based on a first error input/output (I/O) count for the first storage device; and deriving the second reliability based on a second error I/O count for the second storage device.

* * * * *